Oct. 16, 1951 L. E. ELLISON 2,571,695
ELECTRICAL FUEL WEIGHING DEVICE
Filed Dec. 12, 1947 2 SHEETS—SHEET 1

INVENTOR.
LYNN E. ELLISON
BY Edward H. Fang
ATTORNEY

Oct. 16, 1951　　　　　L. E. ELLISON　　　　　2,571,695
ELECTRICAL FUEL WEIGHING DEVICE
Filed Dec. 12, 1947　　　　　　　　　　　　2 SHEETS—SHEET 2

INVENTOR.
LYNN E. ELLISON
BY Edward H. Lang
ATTORNEY

Patented Oct. 16, 1951

2,571,695

UNITED STATES PATENT OFFICE 2,571,695

ELECTRICAL FUEL WEIGHING DEVICE

Lynn E. Ellison, Crystal Lake, Ill., assignor to The Pure Oil Company, Chicago, Ill., a corporation of Ohio Application December 12, 1947, Serial No. 791,401

6 Claims. (Cl. 73—113)

This invention relates to an apparatus for automatically controlling and metering the flow of materials, such as liquids. More particularly, the invention relates to the accurate metering and timing of the flow of liquid passing a given point. It has particular application in the metering of fuel flowing to a load, such as an engine.

In the experimental testing of engines, it is common practice to operate at a given load and speed and to meter the quantity of fuel consumed. Generally, the technique involves the development of steady state conditions and timing the period necessary to consume a measured quantity of the fuel. Similarly, in many operations in process industries, the filling of jars, bottles, or cans with liquids involves a metering problem co-ordinated with a timing problem.

It is, accordingly, an object of this invention to provide a metering apparatus of general application which automatically and accurately measures out a given quantity of material.

It is a second object of this invention to provide an apparatus for the metering and timing of the flow of a given quantity of material in a specific sequence of steps.

Another object of the invention is to provide apparatus for the periodic measurement of a predetermined quantity of material.

Other objects and advantages of this invention will in part be obvious and in part appear hereinafter.

This invention, accordingly, comprises the apparatus having the features of construction, combinations of elements and arrangement of parts to be hereinafter described and includes regulating devices and lines for controlling the flow material from a source in combination with a material measuring device and electrical timing and activating units. More particularly, a specific form of the invention includes a combination of valves for controlling the flow of a given amount of liquid to a container, weighing or measuring means for judging the quantity of liquid in the container, and means for transmitting intelligence electrically to and from the weighing or measuring means to take the apparatus through a series of operations to pass the liquid to a delivery point or load.

Figure 1:
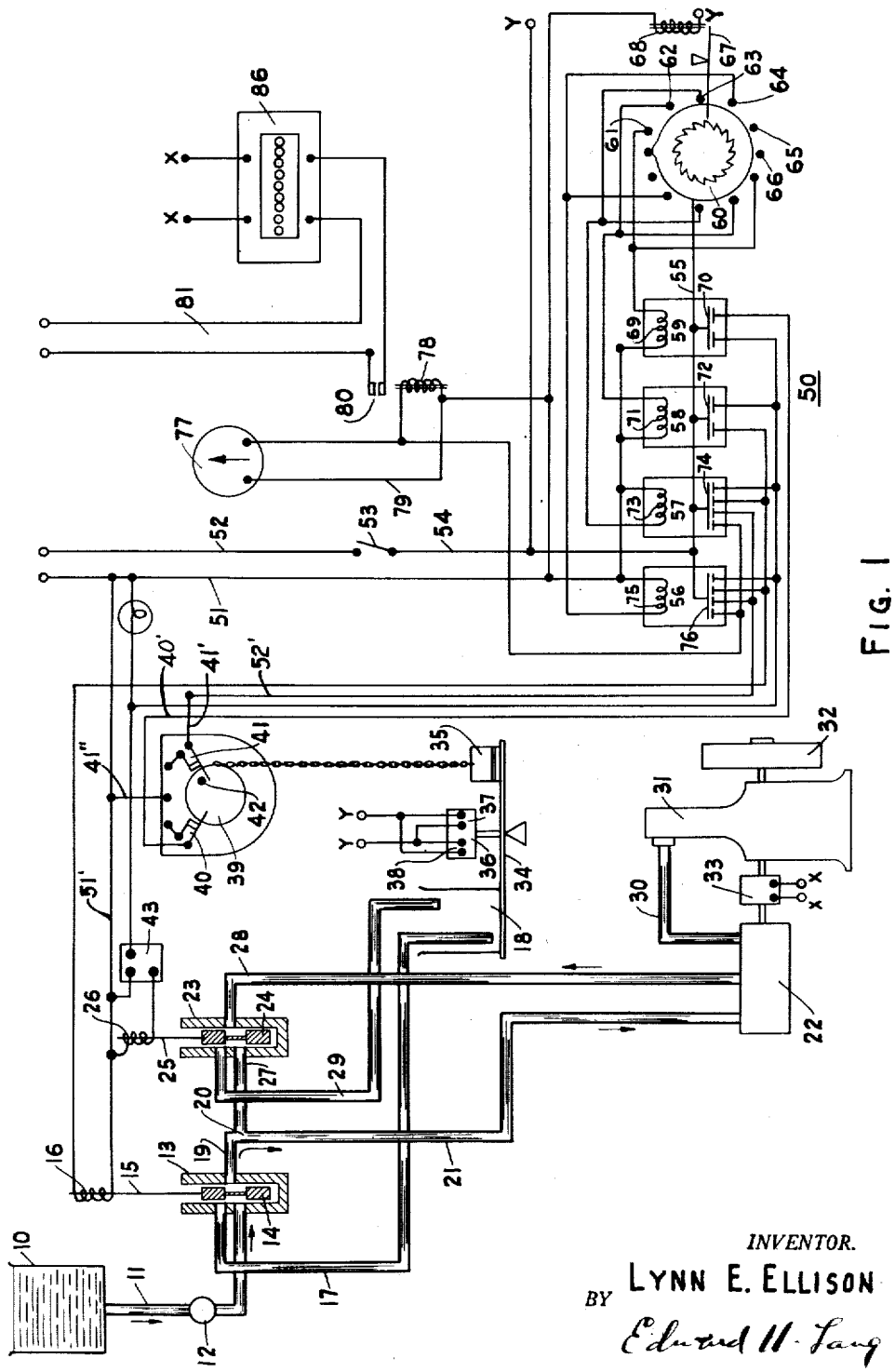
Figure 1 shows a diagram of the apparatus for controlling liquid flow which illustrates the arrangement of the several elements and the means by which the electrical signals are generated and transmitted through the apparatus to control the operations.

Reference to Figure 1 will indicate that the apparatus consists generally of four sections, a fluid supply and metering section, a load or delivery point, a power supply and recording section, and a control section. These several parts of the apparatus are inter-connected so that signals generated in one are transmitted to another to initiate the flow of liquid from a source to the measuring device, measure a specific amount thereof, and cut off the flow after a pre-determined interval to permit delivery of the measured amount, and re-establish conditions for the start of a second cycle.

In the figure, 10 represents the primary source of fluid from which flow is obtained through line 11, controlled by valve 12, to solenoid valve 13, which is a three-way valve illustrated in conventional style. Controlling flow through valve 13 is plunger 14 which is coupled by means of rod 15 to coil 16. Leading from valve 13 is a conduit 17 making connection with a container 18. A second exit from valve 13 is through conduit 19 past junction point 20 through conduit 21 into load or delivery point 22. Depending upon the position of plunger 14, in valve 13, the course of the liquid therethrough can take one or two paths: with the plunger 14 in the position shown in Figure 1, the course for liquid flow through the valve is from conduit 11, through the valve 13 to line 19 and thence through conduit 21 to the delivery point 22; when the plunger 14 is raised to its second position, the opening of line 11 is closed and the path of liquid is from container 18 through line 17 through the valve into line 19.

Valve 23 is substantially identical with valve 13 in that it is a three-way valve illustrated in conventional style and has a plunger 24, coupled by means of rod 25 to coil 26. Entry of liquid into valve 23 is accomplished by way of line 28, and the exit of liquid therefrom by line 29 leading into line 21 or, through line 29 leading to container 18. Valve 23, like valve 13, creates a condition such that several alternative paths for liquid are available upon passage therethrough. With the plunger 24 in the position shown in Figure 1, liquid will pass into the valve through line 27 and out through line 28 to delivery point 22. With the plunger in the raised position to close off line 27 and open 29, passage of liquid will be from delivery point 22 through line 28 through the valve, through line 29 to container 18.

Because for some purposes, the consumption of liquid at the load is accomplished at a certain rate, bypass provision has to be made and this accounts for the arrangement of conduits.

The conduit arrangement and functioning of the valves are discussed and described in greater detail in connection with the description of the operation of the apparatus, aided by Figures 2, 3 and 4.

As a specific embodiment of the invention, the delivery point 22 of the apparatus is considered in the instant case to be a metering pump for supplying a determined amount of fuel with each stroke through line 30 to an internal combustion engine 31. For proper operation of such a pump, a bypass system which includes line 28 is employed, the excess fuel available at each stroke of the pump being passed through conduit 28 and from there directed either back through line 21 to delivery point 22, or through line 29 to measuring apparatus 18. Power is delivered by the internal combustion engine at wheel 32. Revolutions of the engine are counted and recorded by counting mechanism 33 which transmits its signals across terminals X—X to the input part of the timing and recording section of the apparatus.

In the instant embodiment, container 18, forming part of the measuring apparatus, rests on scale platform 34 and is counter-balanced by weight 35. Mounted on the scale and controlled by its movement is a mercury switch 36 having two pairs of contacts, 37 and 38, arranged so that the tilting of the scale in the one direction will open one pair of contacts, and close the second, whereas tilting in the opposite direction will open the second pair of contacts and close the first. Electrical connection of the mercury switch to the control section of the apparatus is made by way of terminals Y—Y.

Figure 5:
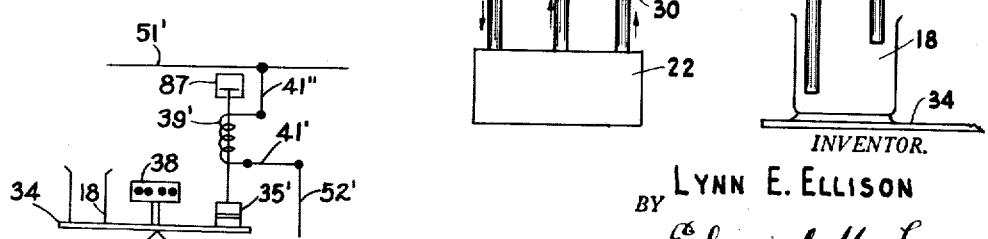
Figure 5 illustrates a modification of the control circuit shown in Figure 1 whereby one of the circuit elements is actuated by means of a solenoid in place of an electric motor.

The raising and lowering of the weight 35 on the scale 34 is controlled by a small motor 39 which is energized from a standard power supply and receives its signals from the control section of the apparatus. Contacts 40 and 41 are limit switches to allow the motor 39 to raise and lower the weight 35 by limiting the motor to a definite amount of travel by action of lug 42 in opening the limit switches. A solenoid 39' could serve in place of motor 39, but would require that its movement be damped to smooth the operation of the measuring apparatus by means of a mechanical retarding device. This substitution is illustrated schematically by means of Figure 5 wherein is described the insertion of the electrically energized coil of the solenoid 39' in series between conductors 41' and 41". The mechanical retarding device, in this instance a double acting dashpot 87, which serves to check the abrupt movement of the solenoid operated weight 35' is affixed to the weight supporting shaft. Common variations of the usual dashpot consist of bellows as well as inverted cups designed to trap air or other gases. Devices of this type may operate by permitting the enclosed gas or liquid to escape slowly through a small orifice. When a solenoid is employed to raise and lower the weight 35' conductor 40' performs no function and accordingly may be eliminated from the operative circuit.

The flow of electric current to the solenoid valve 23 is controlled in part by time-delay relay 43 which is in the power line to the valves 23 and 13.

The electrical control portion of the apparatus is centered in a plurality of relays designated generally by the numeral 50, to which standard 60 cycle, 110-120 volt, power supply is brought and from which a sequence of timing operations transmits appropriate signals to the motor, solenoid valves, and liquid supply to bring measured quantities of liquid to the delivery fuel pump 22.

The power supply is brought into the apparatus through lines 51 and 52, controlled by switch 53 from which connection is made via line 54 to line 55 and a group of relays 56, 57, 58 and 59. Line 55 is brought to stepping relay 60 having contact points 61, 62, 63, 64, 65 and 66. Movement of the stepping relay 60 is controlled by pawl 67 operated by solenoid 68 which, it will be observed, is energized by connection directly to the standard power supply and includes mercury switch 36 in its circuit. It is indicated at the solenoid 68 that the two sides of the line are connected to points Y—Y which appear as the connection terminals for the mercury contact switch 36.

Stepping relay 60 when in the position 61 completes a circuit through coil 69 of relay 59 which acts to close switch 70. In a similar manner, stepping relay 60 when in position 62 energizes coil 71 of relay 58 to close switch 72. In position 63, stepping relay 60 will energize coil 73 of relay 57 to close switch 74. In position 64, stepping relay 60 will energize coil 75 of relay 56 to close switch 76. Position 65 of stepping relay 60 is for the completion of the cycle and position 66 is a spare.

Also connected across the standard power supply, in the power supply and recording section of the apparatus, there is timing clock 77, which has coil 78 in its supply line 79 whereby contact 80 in line 81 can be opened and closed. Line 81 supplies direct current to revolution counter 86 which is connected to the counting mechanism 33 used with an internal combustion engine by connecting it at points X—X as indicated.

Figure 2:
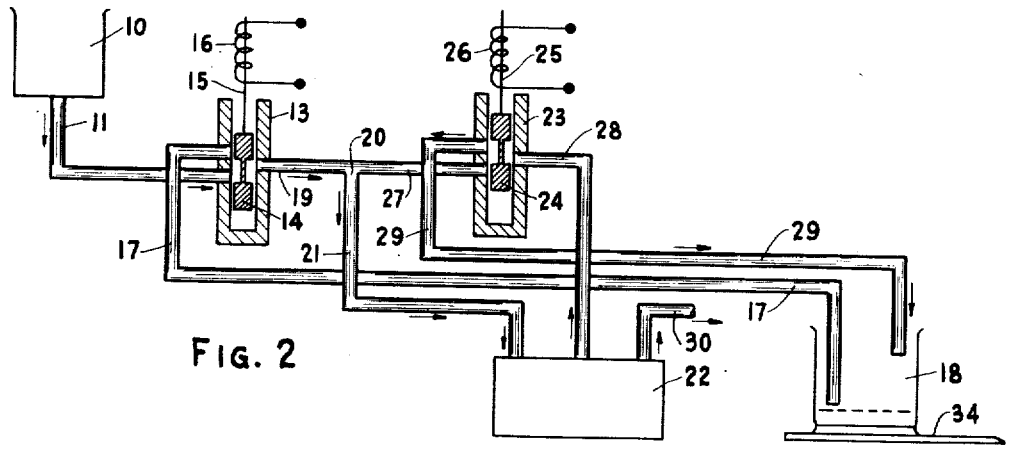
Figures 2, 3 and 4 are explanatory diagrams illustrating the material flow circuit in specific application to an internal combustion engine and its co-ordination with the control section of the apparatus.
Figure 3:
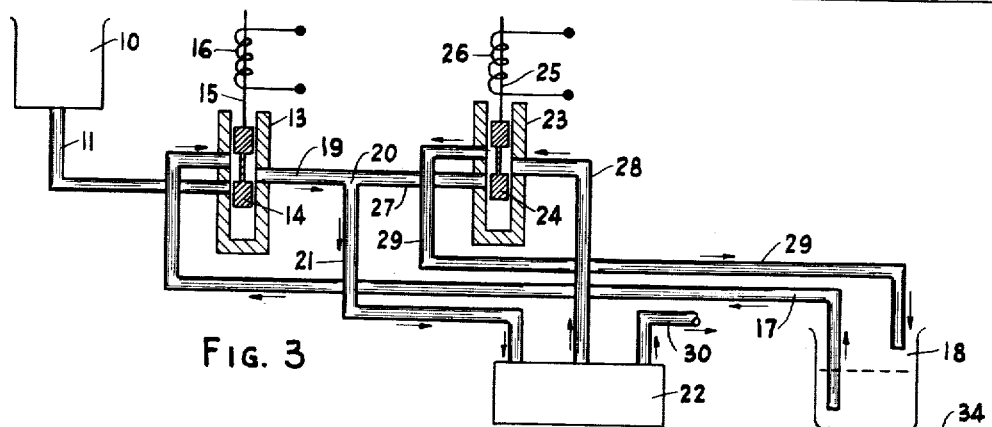
Figure 4:
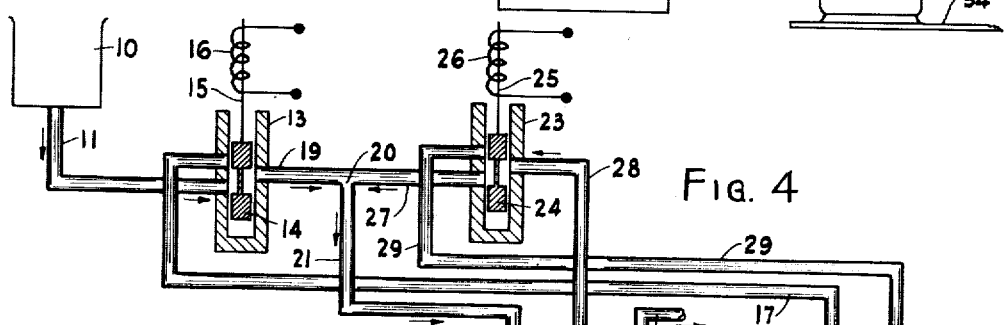

The relationship of the several units to each other can be determined by tracing the electrical circuit to and from the stepping relay as it takes its several positions and by reference to Figures 2, 3, and 4 to determine the successive positions of valves 13 and 23 and the consequent changes in the course of the liquid flow through the liquid circuit. The course of liquid flow indicated by arrows in Figure 1 is such that container 18 is bypassed entirely, which condition prevails before measurements are made.

When switch 53 is closed, current flows through coil 68 to activate pawl 67 and index stepping relay 60 into position 61. With the relay 60 in position 61, coil 69 in relay 59 is energized to close the contacts of switch 70, thereby to allow current to flow through motor 39 and time-delay relay 43. Valves 13 and 23 take the positions shown in Figure 2 so that the course of liquid flow is from container 10 through conduit 11, through valve 13, into conduit 19 to 21 and down to delivery point 22. In the specific embodiment of the invention, delivery point 22 is a fuel pump for an engine, which forces fuel to the engine by way of line 30. Excess is bypassed into line 28 through valve 23 and line 29 to container 18.

When the stepping relay indexes into position 62, coil 71 in relay 58 is activated to close switch 72, whereby valves 13 and 23 are energized to take the positions shown in Figure 3, in which 13 is changed and 23 remains the same. When the valves are in these positions, with plungers 14 and 24 upraised, flow from container 10 through conduit 11 to valve 13 is stopped. The course of liquid flow through the circuit when the delivery point is an engine pump is from delivery point 22 to the engine by way of line 30, excess being bypassed by way of line 28 through valve 23 and to container 18, from which liquid flows by way of line 17 through valve 13 and into line 19 back to delivery point 22. This liquid circuit, it will be noted, causes liquid to be consumed from the measured quantity in container 18 and allows for bypassing of a certain portion thereof during the consumption period in order to insure delivery of a steady amount to the load.

When the stepping relay indexes into position 63, coil 73 in relay 57 is energized to close switch 74 maintaining valves 13 and 23 in their positions and at the same time activating motor 39 and energizing timing clock 77 by way of relay 78. This operation is performed to time the consumption of the fuel.

When stepping relay indexes into position 64, coil 75 in relay 56 is activated, thereby closing switch 76 to maintain valves 13 and 23 in position and also to energize the timing clock.

When the stepping relay indexes into position 65, no current flows through relay 78 or to the valves 13 and 23. The timing clock 77 and valves 13 and 23 return to their first positions and the valves allow liquid to pass from the supply 10 to the delivery point 22. With the relays in this position, the positions of the valves are shown in the diagram constituting Figure 4 where the course of liquid is from container 10 through valve 13 to conduit 19 to delivery point 22, a certain amount being pumped to the engine and excess being bypassed through line 28 through valve 23 and back to conduit 19.

A second cycle can be started by moving switch 53 into the off position and back into the on position, thereby indexing stepping relay into position 61.

In operation, when the switch 53 is closed, current will flow to coil 66 via contacts 37 of mercury switch 36, activate pawl 67 and cause the stepping relay 60 to index into position 61. By the closing of this circuit, current is made to flow through coil 69 of relay 59 to close switch 70 and thereby to cause current to flow through the motor 39 and time-delay relay 43. When the motor 39 is started, it lowers weight 35 to the platform of scale 34, which retains container 18 in the raised position shown. By proper adjustment of the time-delay relay 43, the weight lowering operation can be timed so that when the motor 39 has completely lowered the weight 35, the time-delay relay 43 will trip and cause current to flow through the coil 26 controlling valve 23 to open it. With the valve 23 energized and open, liquid flows from container 10 through conduit 11 and valve 13 to conduits 19 and 21 to enter the delivery pump 22. Since it is desired to maintain steady state operating conditions of a load, each as an engine, fuel is pumped to the engine by the delivery pump 22 through line 30, excess fuel being bypassed through line 28, valve 22 and line 29 over to container 18 where it accumulates and is measured. When sufficient has accumulated to over-balance the weight 35, the container 18 will be lowered, and as the scale is tilted into the new position, the mercury switch 36 opens its first pair of contact points 37 and makes a new contact at point 38 in the second position.

The new position of the mercury switch 36 causes the controlling coil 68 of the stepping relay switch 60 to index into its second position 62, which causes it to energize coil 71 of relay 58 and close switch 72. With switch 72 closed, current will flow to valves 13 and 22 to put them in the positions shown in Figure 3.

It will be seen that with the valves in this position, the liquid circuit is such that no fuel flows from the primary source of supply 10 but the fuel is consumed from the container 18. The fuel flowing into container 18 from line 28 is the fuel bypassed by the fuel pump 22 because it is desired to deliver a constant known quantity of fuel to the engine.

When sufficient of the liquid in container 18 has been consumed to lighten the load on the scale 34, the container 18 will be raised, mercury switch 36 will shift back to its first position to close contacts 37 and repeat its previous cycle of indexing stepping relay 60 to its third position 63. With the relay in position 63, coil 73 of relay 57 will be energized to close switch 74 causing current to flow to valves 13 and 22 to retain them in their positions. With the switches in this position, the motor 39 will be activated to raise the weight 35 from the platform of the scales.

When the weight 35 is thus raised from the platform of the scales, the container 18 is lowered, thereby causing mercury switch 29 to shift to make a new contact at points 38, and at the same time causing stepping relay 60 to index to position 64. With the stepping relay in this position, current flows to coil 75 of relay 56 to close switch 76 and thereby hold valves 13 and 22 in the position shown in Figure 3 to permit fuel to flow from the container 18 to the delivery point. At the same time, current flows to relay 78 controlling revolution counter 86 and time clock 77. With the relay 78 in its closed position, the clock 77 and the counter 86 measure the total time and the number of revolutions completed by test engine 31. When the engine has consumed an amount of fuel which compares with the weight 35, the scales will tip and container 18 will rise, causing the mercury switch 36 to open at points 38 and remake the circuit at points 37. With this operation, stepping relay 60 is again energized and indexed to a new position 65. In this position, no current flows to coil 75 of relay 56, thus cutting off the flow of current to the timing clock 77 and to the counter 86. At the same time, valves 13 and 22 are returned to their normal positions shown in Figure 4, permitting fuel or fluid to be consumed from the main supply 10.

With this last operation, the device completes a cycle in which a measured quantity of fuel is consumed, the length of time required for its consumption is recorded, and, if the operation is a test on an internal combustion engine, the number of revolutions which the engine has made counted.

What is claimed is:

1. In a metering apparatus for regulations flow of liquids, in combination with a primary supply, electrically actuated control valves, a receiving vessel, a weighing scale for supporting the said receiving vessel, a first conduit from the primary supply through the first one of said control valves to a delivery point, a second conduit from said delivery point to the second of said control valves, a third conduit from the second of said control valves to said receiving vessel, a fourth conduit from said receiving vessel to the first of said control valves, and a fifth conduit connecting said first conduit to the second of said control valves, and control means including an electrical circuit, a plurality of relays to synchronize the action of the several portions of the apparatus, the first of the said relays to energize said control valves to cause liquids to flow from said primary supply to said receiving vessel, the second relay being energized when a predetermined amount of liquid enters said receiving vessel to interrupt the flow of liquid thereto, a third relay which energizes the valves to cause liquid to flow from said receiving vessel to the delivery point, a fourth relay which is energized by said weighing scale when the predetermined quantity of liquid has flown out therefrom, said fourth relay also causing said receiving vessel to assume a position in which it can receive additional liquid, whereby a fifth relay operates to energize the said control valves to permit liquid to flow from the primary supply on the consumption of a given quantity of liquid at the delivery point.

2. In a fuel metering apparatus for measuring the rate of consumption of liquid fuel in an internal combustion engine, a primary supply vessel in which in which a supply is maintained, electrically operated control valves, a receiving vessel, a weighing scale for supporting the receiving vessel, and a first conduit from the supply vessel to and through one path in the first one of said control valves to a delivery point, a second conduit from the delivery point to the second control valve, a third conduit from the second of said control valves to a receiving vessel, a fourth conduit from the receiving vessel to the first of said control valves, and fifth conduit connecting said first conduit to the second of said control valves, the conduits being connected to the control valves so that activation of the valves will provide a flow through any two conduits connected to either of the valves and means for controlling the flow of fuel and measuring the quantity thereof comprising, an electrical circuit, an energizing switch on the said weighing scale to initiate the movements of a series of relays through a stepping relay, the series of relays being arranged to initiate the sequence of operations in the measurement of a quantity of fuel, the first of said relays being connected to said valves to cause one to alter the path of fuel to the engine so that fuel passes to the engine for consumption via the first mentioned conduit and a certain amount is also passed by said second and third conduits to said receiving vessel and weighing scale for measurement, a second relay connected to the stepping relay and said valves to adjust the valves and cut off the flow of fuel to the engine from the primary supply and replace it with flow from the fuel accumulated in the receiving vessel, and also allow for bypass of excess fuel over that required by the engine back to the measured quantity, and a relay to adjust the position of said valves upon the consumption of the measured quantity of fuel so that flow from the primary supply is restored.

3. In a fuel metering apparatus for measuring the rate of consumption of liquid fuel in an internal combustion engine, a primary supply vessel in which a supply of liquid fuel is maintained, electrically actuated control valves, a receiving vessel, a weighing scale for supporting the receiving vessel, and a first conduit from the supply vessel to and through one path in the first one of said control valves to a delivery point, a second conduit from said delivery point to the second of said control valves, a third conduit from the second of said control valves to said receiving vessel, a fourth conduit from said receiving vessel to the first of said control valves, and a fifth conduit connecting said first conduit to the second of said control valves, the conduits being connected to the control valves so that actuation of the valves will provide flow through any two of the conduits connected to either of the valves, and means for controlling the flow of fuel and measuring the quantity thereof comprising, an electrical circuit, an energizing switch on the weighing scale to control and initiate the movements of a series of electrically actuated relays through a stepping relay, the series of relays being arranged to initiate a sequence of operations in the measurement of a quantity of fuel, the first of said relays being connected to said valves to cause one to alter the path of fuel to the engine so that fuel passes to the engine for consumption via the first-mentioned conduit, and a certain amount is also passed to said receiving vessel and weighing apparatus for measurement via said second and third mentioned conduits, a second relay connected to the stepping relay and said valves to adjust the valves and cut off the flow of fuel to the engine from the primary supply and replace it with flow from the measured quantity accumulated in the receiving vessel, and also allow for bypass of excess fuel over that required by the engine back to the measured quantity, additional relays connected to said stepping relay to actuate a revolution counter and timing device to count the number of revolutions made by the engine during the consumption of the measured quantity of fuel and to measure the time for the consumption thereof, and a relay to adjust the positions of said valves upon the consumption of the measured quantity of fuel so that flow from the primary supply is restored and revolution counting and timing are interrupted.

4. A fuel metering apparatus as defined in claim 2 wherein the means for weighing the quantity of fluid comprises scales in combination with a double pole liquid contact switch and an electric motor restricted to limited travel by means of limit switches, said motor having connected thereto a weight to be raised and lowered from the scale pan upon travel of the motor between the limit points.

5. A fuel metering apparatus as defined in claim 2 wherein the means for weighing the quantity of fluid comprises, scales in combination with a double pole liquid contact switch and a solenoid having a shaft connected to a weight to be raised and lowered from the scale pan upon energizing said solenoid.

6. In an apparatus for measuring fuel in accordance with claim 2, a means for permitting the receiving vessel to assume the proper position for beginning a measurement involving the placement of a weight on the scales comprising, a time-delay relay inserted in the line energizing one of the electrically actuated valves so that flow of liquid to the receiving vessel is not commenced until the weight is in place on the scale pan.

LYNN E. ELLISON.

REFERENCES CITED

The following references are of record in the file of this patent:

UNITED STATES PATENTS

| Number | Name | Date |
|---|---|---|
| 1,800,640 | Jehle et al. | Apr. 14, 1931 |
| 2,118,079 | Goode et al. | May 24, 1938 |
| 2,327,419 | Grandy | Aug. 24, 1943 |
| 2,409,982 | Longmate | Oct. 22, 1946 |

Certificate of Correction

Patent No. 2,571,695                                              October 16, 1951

LYNN E. ELLISON

It is hereby certified that error appears in the printed specification of the above numbered patent requiring correction as follows:

Column 6, line 62, for "regulations" read *regulating*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*